Dec. 31, 1935.  J. LANZ  2,025,817
CLOSED POLE ELECTRIC MOTOR
Filed July 25, 1933
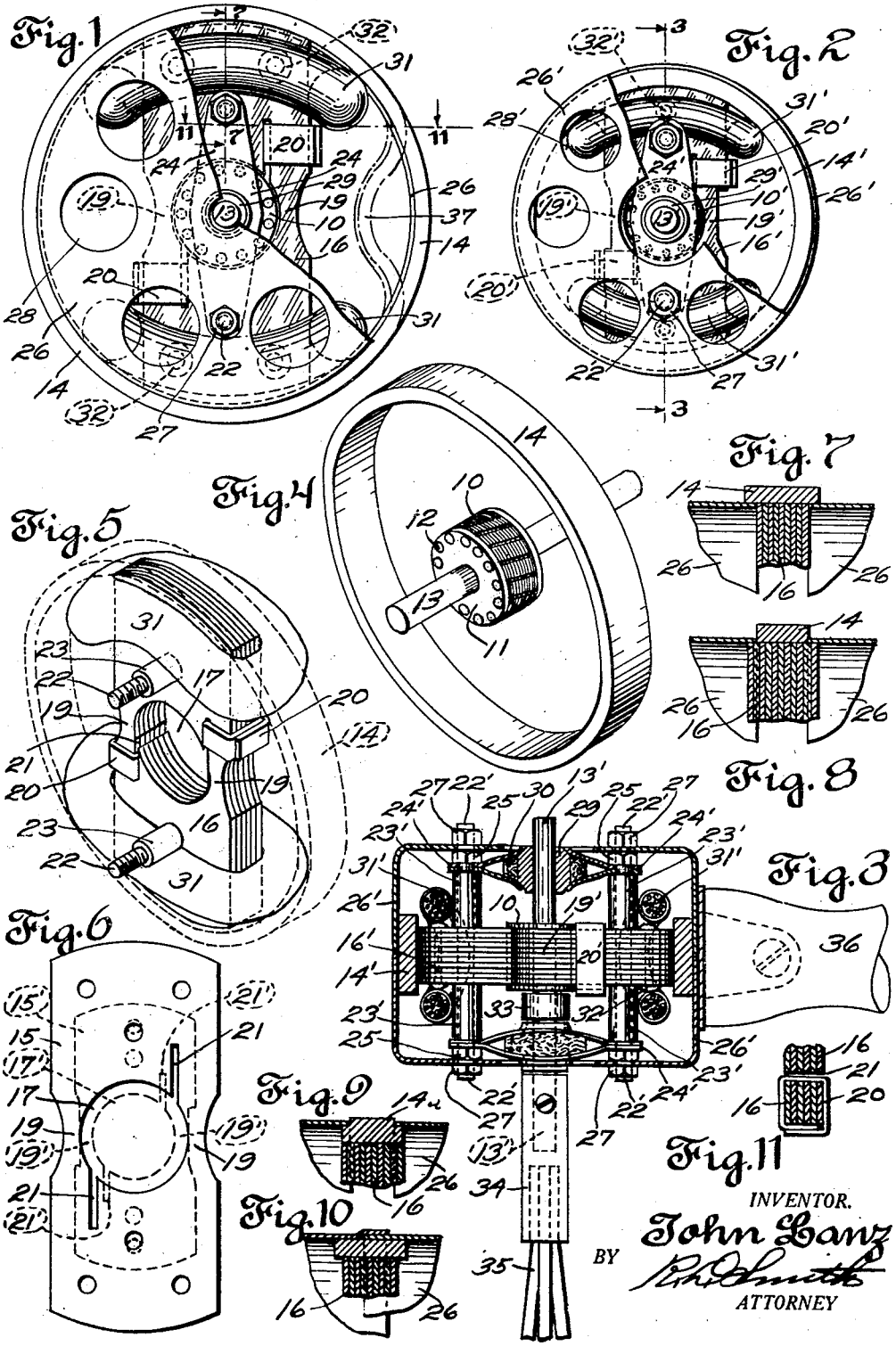
INVENTOR.
John Lanz
BY
ATTORNEY Patented Dec. 31, 1935

2,025,817

UNITED STATES PATENT OFFICE 2,025,817

CLOSED-POLE ELECTRIC MOTOR

John Lanz, New Haven, Conn., assignor to The A. C. Gilbert Company, New Haven, Conn., a corporation of Maryland Application July 25, 1933, Serial No. 682,088

15 Claims. (Cl. 172—275)

This invention relates in general to improvements in dynamo electric machines, particularly alternating current motors, and more particularly to small induction motors of a type suitable for use as built-in prime movers for small portable appliances and tools, such as household fans, food mixers, cream whippers, and the like.

Particularly the present improvements relate to electric motors of a type whose stator structure is composed of at least two sections,—one being a surrounding magnetic yoke centrally of which the axis of the rotor may be disposed, and the other being a structurally separate inner multi-pole body formed to have spoke-like pole portions radiating outwardly from the rotor and together bridging or spanning the space encompassed by such yoke and carrying field windings.

In the older art, the magnetic yoke of such motor stators has commonly comprised a rigid support frame for respectively separate and independent pole pieces individually attached thereto and supported thereby in the exact relation to each other and to the rotor which proper operation of a motor requires, whereas in more recent developments such yoke when laminated has been made up of laminae each of which is aligned in planes common to the planes of the pole piece laminae and hence bearing an edge-to-edge relation thereto.

I have discovered that equal or better dynamo electric performance may be obtained by a radical departure from these former practices offering important advantages which substantially lower the cost and increase the ease and surety of dependable results in manufacture. By forming the magnetic yoke from pliant metal preferably having some small degree of resiliency and by making the yoke of sufficient width and thinness to fit tightly against and contact with the outer edges of a plurality of the laminae comprising the inner pole body in the manner of a binding hoop, I find that desirable power and other desirable characteristics of motor performance may be obtained while eliminating many of the manufacturing difficulties inherent in the former practice of providing rigid, cast metal surrounding frames or frames composed of laminae aligned to a common plane with the laminae of the inner pole body.

I have found that a magnetic yoke structure built to accord with the above differences from prior practice may be made of commonly available metals such as cold rolled steel and satisfactorily conduct the magnetic flux even when made very thin in the plane of its flexure to conform to the inner pole body so that the usual machining operations required to fabricate a cast metal or laminated outer frame yoke may be done away with and a motor of substantially smaller overall size can be produced corresponding to an inner pole body of any given dimension, than has heretofore been possible.

This novel kind of magnetic yoke more easily lends itself to the secure and rigid holding of housing shells, attachment of handles, etc., as commonly provided in portable tools and household electrical appliances than do prior forms of yoke structures composed of laminae disposed in crosswise relation to the rotor axis. For this and other reasons, my improved motor is better suited to serve as power unit for such tools and appliances. Other objects and accomplishments of the invention will appear from the description hereinafter.

Reference is had to the accompanying drawing, wherein:

Fig. 1 is an end view of a small motor constructed in accordance with the principles of this invention; the casing being partially broken away to expose interior parts.

Fig. 2 is a similar view of a smaller motor built upon similar principles.

Fig. 3 is a side view of the motor of Fig. 2; the housing and certain other parts being shown in section on the plane 3—3 of Fig. 2 and a handle grip and beater rods being shown attached to the outside of the motor to illustrate one of the many uses to which the present improvements may be put.

Fig. 4 is an isometric view of an armature with its shaft and of a frame ring which may comprise parts of my improved motor.

Fig. 5 shows isometrically a laminated plural-pole body carrying pre-formed field winding coils which will permit of an assembly of the frame ring of Fig. 4 with the parts of Fig. 5 as indicated by the broken line showing of this ring in Fig. 5.

Fig. 6 shows in full lines a possible size and shape for each lamina of the stator of the motor shown in Fig. 1 and further shows in broken lines a successful shape and proportion for the lamina of the plural-pole body of the smaller motor in Fig. 2.

Fig. 7 is a fragmentary view taken in section on the plane 7—7 in Fig. 1 showing the points of joinder of the housing shells, the frame ring and the stator body.

Fig. 8 shows a modified arrangement of the magnetic yoke ring, stator body and housing shells at their point of joinder.

Fig. 9 shows a further modification of the same parts.

Fig. 10 shows still another modification of similar parts.

Fig. 11 is a sectional view looking downward on the plane 11—11 in Fig. 1 showing the shading coil.

As this invention provides a principle of construction for the stator bodies of electric motors of different sizes, I shall designate by the same reference numerals respectively unprimed and primed, the equivalent parts in each of the two motors of different sizes shown in Figs. 1 and 2.

The advantages of the present improvements are mainly attained by a novel construction of the plural-pole body and magnetic yoke portions of the motor, with which stator may be employed some conventional and well known type of armature, one example of which as best shown in Figs. 1, 2 and 4, consists of an ordinary squirrel-cage type of rotor 10 (10' in Figs. 2, 3 and 6) composed of a laminated structure of magnetizable material headed at each end by the electrical conductor discs 11 which are mechanically and electrically joined by conductive rods 12 extending helically through the laminated rotor structure near the periphery thereof. The squirrel-cage armature thus formed is commonly pressed onto the motor shaft 13 (13' in Figs. 2 and 3).

For simplicity of illustration, I designate the magnetic yoke of my novelly constructed stator as a sheet metal member forming the ring 14 of Figs. 1, 4, 5 and 7 (14' in Figs. 2 and 3). It will be understood, however, that the magnetic yoke may have other shapes and may be comprised of more than one ring or yoke each made of one or more magnetically joined parts if desired, and may be structurally integral with or separate from the housing of the motor and any rotor bearings employed.

For manufacturing purposes, I prefer to make the laminated plural-pole body separable from the above mentioned magnetic yoke and I conveniently form the plural-pole body from laminae 15 for the size of the motor shown in Figs. 1, 4 and 5,—or 15' for the smaller motor of Figs. 2 and 3; each of these laminae being detailed in Fig. 6. The plural-pole body as a whole is designated as 16 in Figs. 1 and 5, and as 16' in Figs. 2 and 3.

I may employ a two-pole stator of laminæ simply shaped as shown in Fig. 6, in which the metal of one pole at the top of the armature opening 17 (17' in Figs. 2 and 3) is continuous with the metal of the other pole at the bottom of the rotor opening 17. This principle of construction is, of course, as readily embodiable in stators having more than two poles, as are the other novel features herein described.

I have discovered that best performance of the motor is produced by a properly small cross sectional area of the stator body 16 or 16' in its portions 19 (19' in Figs. 2 and 6) adjacent the rotor opening 17 or 17'. I have further discovered that in a stator so constructed, I can secure a desirably strong starting torque by the introduction of shading coils 20 (20' in Figs. 2 and 3) in the manner most clearly shown in Figs. 5 and 11 where a single strip of conductive metal is introduced through a notch 21 (21' in Fig. 2) and bent into surface contact with the outer faces of the stator body in its portion adjacent the notch 21, overlapping itself against the outer edge of the stator body 16 or 16' as clearly shown in Figs. 5 and 11 for the convenient application of solder or other means of securing the conductive strip in place. The notch 21 may or may not open into the rotor opening 17 and each of the two shading coils may be formed alike.

Penetrating a plural-pole body of this nature, I may employ the threaded through-studs 22 (22' in Figs. 2 and 3) which at both sides of the stator carry the spacer collars 23 (23' in Fig. 3) and the bearing holders 24 (24' in Figs. 2 and 3) retained by the nuts 25. The housing shells 26 (26' in Figs. 2 and 3) are of a diameter to fit the magnetic yoke rings 14 or 14' and are perforated to fit over the through studs 22 or 22' and be retained by the exterior nuts 27. The housing shells may be provided with suitable openings 28 (28' in Fig. 2) for passage of air to cool the motor.

Novelty is not claimed in this application for the particular construction of the motor shaft bearings, one of which is shown sectioned in Fig. 3 comprised of the bearing bushing 29 and the surrounding felt washer 30, both retained by the holders 24'. Any of the many conventional forms of bearing may be used.

It should be noted, however, that the novel provision for the support of bearings 29 which consists in the mounting of brackets 24 by means of studs 23 solely upon the inner stator body 16 rather than supporting the bearings in part or in whole by attachment to the ring 14 or such other form of frame structure as is employed, insures accuracy of alinement of the rotor 10 with the opening 17 independent of variation in the assembled relation of the stator body 16 to the ring 14.

The shading bands or coils 20 are novelly disposed to lie outside the territory of the stator body 16 which is encompassed by the field winding 31, and between the latter and the rotor opening 17, although I may otherwise dispose the shading coils. It will also be noted that contrary to former practices, it has been found possible in my novel arrangement of parts to use the simplest form of one piece conductive strip to serve as a shading coil, including that portion of the coil which passes through the notch 21. (See Fig. 11.) Thus the use of rivets of conductive metal to penetrate the metal of the stator is done away with and also the requirement to form the shading coil of two or more parts.

Note should also be made of the novel shape given to the stator body 16 whereby the disposition of the straight edges of this cross bar would not, without the provision of the cut-outs in such edges at the sections 19, produce a sufficiently thin cross section of stator metal at this point to meet the best operating requirements. Advantages of the provision of such cut-outs include the use, thereby made possible, of running sheet metal strip as raw material from which the laminæ may be cut in quantity production, and which strip may thus be wider in its portions designed to be surrounded by the field windings 13 and in relation to the diameter of the rotor opening 17 than would otherwise be possible without the expedient of these cut-outs to reduce the cross section of the stator metal.

With this understanding of the novel nature of my improved stator structure, it will be perceived that a maximum space is afforded for the introduction of unusually large, pre-formed coils of field winding which may be placed over each outward end of the stator body 16 or 16' before the frame ring 14 or 14' is assembled with the latter. These field coils are shown at 31 in Figs. 1 and 5 at 31' in Figs. 2 and 3. Fig. 3 shows particularly well the ample room that exists for even larger coils, or if preferred, for the further reduction in the overall size of the housing if the latter were constructed according to Figs. 7 or 8. It will also be noted that the field coils are kept from any possibility of moving into interference with the rotor by their retention between the studs 22 or 22' and the exterior frame or housing parts.

Fig. 9 shows a method of joining the housing shells with the yoke ring 14a independently of the laminated stator and Fig. 10 shows how the abutting shell edges of Fig. 3 may be overlapped for greater rigidity and tightness.

While no means are shown for securing the yoke ring 14 or 14' to the stator body 16 or 16', such might be provided in the form of screws or otherwise, but I have found it feasible to provide a press fit between these parts. Motor performance is improved by making the ring 14 or 14' of magnetizable material. This possibility of employing a press fit of the stator body 16 within the ring 14 as the sole means of securing them together, results in part from the relative radial thinness of the ring 14 which permits it to deform to a minute extent from a true circle of shape if this be required to accommodate the pressing of cross bar 16 into the ring. While such deformation might be imperceptible and of no mechanical effect in the relationship of ring 14 to any of the other mechanical parts associated therewith, such as handle or housing parts, it will be appreciated that this ability of action relieves the requirements of exact machining operations for producing the bar length and the inside diameter of the ring for press fit assemblage, and thus reduces the cost of manufacture.

Referring to Fig. 3, it will be seen that the laminæ 15 or 15' of the stator body may be held together independently of the through-studs 22 or 22' by rivets 32' and that thrust means for the armature of the motor may be afforded by a thrust collar 33 between the armature and the interior end of the bearing and by whatever attachment is connected to the outer end of the shaft.

The particular attachment illustrated in Fig. 3 comprises a holder 34 for beater elements 35 only partially shown in the drawing but which at their extremity may be suitably formed for beating eggs, whipping cream, or like purposes. The hub of fan blades or the working part of any useful utensil requiring high speed in its operation may be substituted for the holder 34.

Fig. 3 also indicates a handle grip 36 rigidly secured to the exterior of the motor housing. In some applications of my improved motor it may be more convenient to grasp the housing directly with the hand, thus doing away with any handle such as 36 when the motor is used as a prime mover of a portable tool or appliance. Another advantage of my improved stator construction thereby becomes apparent through the space which it affords for indenting the frame and housing parts at their portion 37 in Fig. 1, which of course may be done at one or more points around the exterior of the frame to afford a better grip for the hand upon the housing, particularly when of a size as large as that shown in Fig. 1. Or for good rigidity, a handle can conveniently be attached directly to the ring 14.

It will suffice to provide here an example of specifications both electrical and mechanical which will yield the results claimed for the present improvements in each of the sizes of motors illustrated in Figs. 1 and 2, it being understood that these exact specifications may be departed from in some instances in wide degree within the novel principles of motor design which they represent.

In the case of the larger motor which may be constructed in substantial accordance with the actual proportions of Fig. 1 of the drawing, I find by practical tests that the frame ring 14 may be made with a radial thickness of $\frac{1}{8}''$; that the stator laminæ 15 may be made .062'' thick and that six such laminae may form the stator body 16; that the horizontal width of the stator section 19 at its most reduced point preferably on a diametrical line through the rotor axis may by $\frac{1}{8}''$ at each side of the rotor 10; that the shading coil 20 may be made of copper strip or other good conductive metal .040'' thick and $\frac{3}{8}''$ wide; and that the coils 31 may each be comprised of 500 turns of #28 copper wire. Cold-rolled steel is found to be a satisfactory material for both the frame ring 14 and the laminae 15. Single phase, alternating current may be supplied at 110 volts with coils 31—31 connected in series.

In the case of the smaller motor which may be constructed in substantial accordance with the actual proportions of Fig. 2 of the drawing, I find by practical tests that the frame ring 14' may be made with a radial thickness of $\frac{1}{8}''$; that the stator laminae 15' may be .062'' thick and that six such laminae may form the stator body 16'; that the horizontal width of the stator section 19' at its most reduced portion preferably on a diametrical line through the rotor axis may be $\frac{3}{32}''$ at each side of the rotor 10''; that the shading coil 20' may be made of copper strip or other good conductive metal .040'' thick by 1.4'' wide; and that the coils 31' may each be comprised of 600 turns of #30 copper wire. Cold-rolled steel is suitable for both the frame ring 14' and the laminæ 15'. Single phase, alternating current may be supplied at 110 volts with coils 31'—31' in series.

Proportions and specifications other than the above are sufficiently clear from the actual size drawing herewith and no limitation to the scope of my invention is to be ascribed to the giving of these specifications or any of them beyond the definitions of the invention as expressed in the following claims.

I claim:

1. A motor body including in combination, a plurality of pole formations radially disposed about a common center and formed from a single piece of metal comprising and connecting said pole formations, a frame surrounding the outer ends of said pole formations, studs projecting from said pole formations, bearing brackets supported by said studs, and field windings confined between said studs and said frame, and surrounding said pole formations.

2. A motor body including in combination, a plurality of pole formations radially disposed about a common center and formed from a single piece of metal comprising and connecting said pole formations, a frame surrounding the outer ends of said pole formations, studs projecting from said pole formations, housing shells supported by said studs, and field windings confined between said studs and said housing shells.

3. In an electric motor having a rotor, a stator possessed of a continuous metal section adapted to completely surround the rotor and including spoke-like portions integral with said section, and a surrounding frame inclusive of a circular band of magnetizable material wider in parallel relation to the rotor axis than is its thickness in a plane transverse said axis, the outer ends of said spoke-like stator portions being shaped and disposed to conform to the same curvature as is described by the circular interior surface of said band throughout its circumferential length so that the stator may be assembled in a plurality of positions in circular relationship to said frame and in each of said positions effect substantially a full circumferential extent of abutting contact of its outer ends against said band.

4. In an electric motor having a rotor, a stator possessed of a continuous metal section adapted to completely surround the rotor and including radially disposed portions integral with said section, field windings carried on different ones of said radially disposed portions, and an outer encompassing non-laminated member of magnetizable material of such physical properties and so proportioned in cross-section as to permit substantial distortion of the encompassing shape of said member without fracture thereof, whereby said member may yield to conform to said stator.

5. A stator for dynamo-electric machines embodying an outer approximately circular ring of magnetizable material, and a relatively rigid body of magnetizable material positioned within and spanning the space encompassed by said ring and provided with a rotor opening around which the metal of said body is continuous, the material of said ring being sufficiently thin in cross section and of sufficient pliancy and resilience to permit without fracture substantial distortion of said ring from its original curvature, thereby to enable the ring to spring into securely holding press-fit assemblage with said rigid body.

6. An electric motor stator including in combination, a compound cylindrical shell-like housing one portion of which comprises a pliant yoke band of magnetizable metal having an elastic limit approximating that of cold rolled steel and substantially thinner than it is wide for comprising a portion of the cylindrical wall of said housing, and a rigid laminated body having con-joined pole formations enclosed by said housing and having a plurality of its laminae abutting endwise against the interior surface of said yoke band.

7. In a motor, a rigid laminated multi-pole stator structure containing a rotor opening and having spoke-like portions extending outwardly therefrom, a yoke disposed magnetically to connect the outer ends of said spoke-like portions and inclusive of a pliant band of magnetizable metal shaped and disposed to be substantially thinner transverse the axis of said rotor opening than it is wide parallel to said axis.

8. In a motor, a rigid laminated multi-pole stator structure containing a rotor opening and having spoke-like portions extending outwardly therefrom, a yoke disposed magnetically to connect the outer ends of said spoke-like portions and comprised of a pliant band of magnetizable metal having an elastic limit approximating that of cold rolled steel and shaped to be substantially thinner transverse the axis of said rotor opening than it is wide parallel to said axis.

9. The method of making a stator for small motors which consists in constructing a relatively pliant encompassing band from thin magnetizable metal and pressing into interiorly spanning assemblage therewith a relatively rigid plural-pole body.

10. The method of making a stator for small motors which consists in forming a somewhat resilient hoop-like magnetic yoke of too great pliancy dependably to support separate pole pieces in accurate operative relation therewithin, forming a rigid body of con-joined pole pieces of greater overall dimension than is the inside size of said yoke, and then forcing said yoke to distort within its elastic limit thereby to grasp and securely hold to said rigid body when the latter is placed in assembled relationship within said yoke.

11. In a motor stator, a laminated bar-shaped multi-pole body containing a central rotor opening, separate coils of field winding carried to surround said body at respectively opposite sides of said rotor opening thereby to electro-magnetize the diametrically opposite terminals of said body to produce a plurality of field poles, and a pliant yoke structure of magnetizable metal arranged magnetically to interconnect the outer ends of the pole terminals of said body.

12. In a motor, a rigid multi-pole stator structure containing a rotor opening and having spoke-like pole portions extending outwardly therefrom and a pliant yoke structure engirdling the axis of said opening and including and deriving its pliancy from a flexible strip of magnetizable material disposed to complete a magnetic path from one to another of said pole portions.

13. An electric motor having a rotor adapted to carry and operate a work performing tool, a stator composed of a bar-shaped body having a central axial bore forming a cavity of a size closely to conform to said rotor, coils of field winding surrounding said bar shaped body, bearings for said rotor disposed at axially opposite sides of said bar-shaped body, and means projecting from axially opposite surfaces of said bar-shaped body intermediate said coils and said rotor to support said bearings in true alignment with the axis of said bore and to hold said bearings spaced apart a distance as great as the combined axial thickness of said bar-shaped body plus its surrounding coils, thereby rotatably to support said rotor with maximum stability for operating the carried tool and to separate said coils from the rotor.

14. The method of making a stator for small motors which consists in constructing a relatively pliant arcuate yoke from thin magnetizable metal and pressing into chordally disposed assemblage therewith a relatively rigid plural-pole body in a manner to cause said metal to flex within its elastic limit in the plane of its least dimension.

15. A stator for dynamo-electric machines embodying a housing including a cylindrical ring-like portion of magnetizable material, and a relatively rigid body of magnetizable material positioned within and spanning the space encompassed by said ring-like portion and provided with a rotor opening around which the metal of said body is continuous, the material of said ring-like portion of the housing being sufficiently thin in cross section and of sufficient pliancy and resilience to permit without fracture sufficient yielding of said ring-like portion to enable said portion to spring into securely holding press-fit assemblage with said rigid body.

JOHN LANZ.